US009739129B2

(12) United States Patent
Cunningham et al.

(10) Patent No.: US 9,739,129 B2
(45) Date of Patent: Aug. 22, 2017

(54) METHODS FOR INCREASED HYDROCARBON RECOVERY THROUGH MINERALIZATION SEALING OF HYDRAULICALLY FRACTURED ROCK FOLLOWED BY REFRACTURING

(71) Applicants: Montana Emergent Technologies, Inc., Butte, MT (US); Montana State University, Bozeman, MT (US)

(72) Inventors: Alfred B. Cunningham, Bozeman, MT (US); Dwight Randall Hiebert, Butte, MT (US)

(73) Assignees: Montana Emergent Technologies, Inc., Butte, MT (US); Montana State University, Bozeman, MT (US)

( * ) Notice: Subject to any disclaimer, the term of this patent is extended or adjusted under 35 U.S.C. 154(b) by 0 days.

(21) Appl. No.: 14/602,127

(22) Filed: Jan. 21, 2015

(65) Prior Publication Data
US 2015/0204176 A1    Jul. 23, 2015

Related U.S. Application Data (60) Provisional application No. 61/929,558, filed on Jan. 21, 2014.

(51) Int. Cl.
*E21B 43/26* (2006.01)
*E21B 33/138* (2006.01)
(Continued)

(52) U.S. Cl.
CPC ......... *E21B 43/26* (2013.01); *C09K 8/5045* (2013.01); *C09K 8/516* (2013.01); *E21B 33/138* (2013.01)

(58) Field of Classification Search
CPC ...................................................... C09K 8/58
(Continued)

(56) References Cited

U.S. PATENT DOCUMENTS 3,118,500 A * 1/1964 Maddox, Jr. ............ C09K 8/60
166/246
3,998,271 A * 12/1976 Cooke, Jr. ................ C09K 8/62
166/280.1

(Continued)

FOREIGN PATENT DOCUMENTS

WO    WO 2013192399 A2    12/2013

OTHER PUBLICATIONS

Phillips, Adrienne, et al., Potential CO2 Leakage Reduction through Biofilm-Induced Calcium Carbonate Precipitation, Environ. Sci. Technol. 2013, 47, at 142-149.

*Primary Examiner* — Anuradha Ahuja
(74) *Attorney, Agent, or Firm* — MacBride Law, PLLC; William L. MacBride, Jr.

(57) ABSTRACT

The invention is a method of increasing hydrocarbon recovery through the biomineralization sealing of fractured geological formations followed by refracturing, including preparing a composition with biochemical components that is delivered into a geological subsurface through a cased well bore. Nutrient solutions are delivered into the geological subsurface through the well bore, thereby metabolizing the nutrient solutions with the biochemical components to create a mineralizing byproduct. Mineralizing solutions are delivered into the geological subsurface, delivering the composition, nutrient solutions and mineralizing solutions to targeted geological formations having existing formation fractures, through casing openings. Mineralizing solutions react with the mineralizing byproduct to produce minerals, which crystallize in the existing formation fractures, sealing and strengthening the existing formation fractures and
(Continued)

resulting in sealed fractures. Targeted geological formations are refractured to create new formation fractures outside of the sealed fractures, exposing new areas of trapped hydrocarbons to production, to increase hydrocarbon recovery.

15 Claims, 11 Drawing Sheets (51) Int. Cl.
C09K 8/504 (2006.01)
C09K 8/516 (2006.01)

(58) Field of Classification Search
USPC .................................................. 166/246
See application file for complete search history.

(56) References Cited

U.S. PATENT DOCUMENTS

| | | | | |
|---|---|---|---|---|
| 4,460,043 A * | 7/1984 | Thompson | ............ | C09K 8/905 166/246 |
| 4,558,739 A * | 12/1985 | McInerney | ............... | B09C 1/00 166/246 |
| 4,561,500 A * | 12/1985 | Thompson | ............ | C09K 8/905 166/246 |
| 5,143,155 A * | 9/1992 | Ferris | .................... | C09K 8/905 166/246 |
| 5,181,568 A | 1/1993 | McKown et al. | | |
| 5,273,115 A | 12/1993 | Spafford | | |
| 8,141,638 B2 | 3/2012 | Tulissi et al. | | |
| 9,376,610 B2 * | 6/2016 | Hendrickson | .......... | C09K 8/582 |
| 2004/0244978 A1 * | 12/2004 | Shaarpour | ............ | C09K 8/035 166/293 |
| 2005/0000690 A1 * | 1/2005 | Boney | ................... | E21B 43/267 166/280.2 |
| 2006/0000612 A1 * | 1/2006 | Reddy | ..................... | C04B 14/38 166/293 |
| 2006/0216811 A1 | 9/2006 | Cunningham et al. | | |
| 2008/0093073 A1 * | 4/2008 | Bustos | ..................... | C09K 8/68 166/279 |
| 2011/0220359 A1 * | 9/2011 | Soliman | ................... | C09K 8/88 166/305.1 |
| 2012/0241148 A1 * | 9/2012 | Alsop | ..................... | E21B 43/20 166/246 |
| 2014/0251622 A1 * | 9/2014 | Coates | ................... | C09K 8/582 166/307 |
| 2015/0122486 A1 * | 5/2015 | Luke | ...................... | C09K 8/467 166/246 |

* cited by examiner

METHODS FOR INCREASED HYDROCARBON RECOVERY THROUGH MINERALIZATION SEALING OF HYDRAULICALLY FRACTURED ROCK FOLLOWED BY REFRACTURING

CROSS-REFERENCE TO RELATED APPLICATIONS

This application claims priority to, and the benefit of, U.S. Provisional Patent Application Ser. No. 61/929,558 entitled, "Increased Hydrocarbon Recovery Through Biomineralization Plugging of Hydraulically-Fractured Rock Followed by Refracturing," filed Jan. 21, 2014, the disclosure of which is incorporated herein by reference in its entirety.

FIELD OF THE INVENTION

This invention relates to a method to increase hydrocarbon recovery through mineralization sealing of hydraulically fractured rock within the subsurface, followed by refracturing, such as in an oil or gas (either of which is termed hydrocarbon) well bore.

BACKGROUND

Embodiments described herein relate generally to hydraulic fracturing of rock and, more particularly, to methods for increased hydrocarbon recovery through mineralization sealing of hydraulically fractured rock within the subsurface, followed by refracturing.

A hydrocarbon-bearing subsurface geological formation generally consists of various regions or zones having differing permeability and porosity, defining the characteristics of an oil and/or gas reservoir. Hydrocarbon drive fluid moving through the reservoir preferentially moves to and through regions of higher permeability, such as fractures, bypassing regions of lower permeability, and the oil contained therein. Generally, during oil production, only a portion of the oil contained in a subsurface geological formation is recovered by so-called primary recovery methods of natural reservoir drives and other forces present in the oil-bearing reservoir. Fractures and other high-permeability streaks within the formations may be selectively depleted of oil during production, causing premature entry and production of adjacent gas or water, inhibiting further oil production.

Hydraulic fracturing is commonly used with pressurized fluids, creating fractures in rock so that trapped gas or oil can be produced more easily. A solid proppant, such as sand, is usually left behind in the fractures to ensure that the fractures remain open to provide the necessary porosity and permeability in the formations. Horizontal drilling and more effective isolation of targeted formations along the well bore have allowed better access to thin, highly productive formations.

Even with effective horizontal drilling and hydraulic fracturing, recovery of oil and gas in shale and other formations is typically low. In April 2013, the U.S. Geological Survey estimated that up to 7.4 billion barrels of oil in the Bakken Shale from the Williston Basin in North Dakota and Montana could be recovered using current technology. This is about 4.4% of the 167 billion barrels of oil in place, estimated by the North Dakota Department of Mineral Resources. For shale throughout the world, the U.S. Energy Information Administration estimates overall recovery factors of 15% to 30% for shale gas and 3% to 7% for shale oil.

Poor production recovery after hydraulic fracturing is often because most of the hydrocarbon-bearing portions of reservoir rocks are unaffected by the fracturing process, as hydraulic fracturing affects a small percentage of the rock in a radius proximal to the well bore. Hence, the quantity of oil produced out of a well from a typical shale formation, such as the Bakken Shale, is limited. Moreover, the price of oil and/or other economic factors often reduce the life of a well. In some instances, secondary recovery technologies may be able to rejuvenate and increase the profits from such wells. For example, to gain access to untouched hydrocarbon-bearing zones in a producing well in a low permeability in a fractured rock, the reservoir rock can be fractured further (i.e., refractured); however, the original fractures need to be sealed so that new fractures can be formed to access the hydrocarbon contained therein.

For example, some known techniques for recovering hydrocarbons by hydraulic fracturing include injecting or delivering proppant materials and/or fracturing fluids, such as an acid solution, to fracture a subsurface geological formation. To access untouched hydrocarbon-bearing zones, a sealing material or solution of non-living chemicals, cements, slurries, gels, and/or polymers can be injected into the geological formation and, as such, amorphous solids fill the formation fracture void spaces, which can then allow for refracturing. For example, some known methods of sealing fractures with non-living chemicals, cements, slurries, gels, and/or polymers are described in U.S. Pat. No. 5,181,568. U.S. Pat. No. 5,273,115, and U.S. Pat. No. 8,141,638, and International Patent Publication No. WO 2013192399A2. These methods are limited, however, because such sealing materials often solidify within a relatively shallow distance from the well bore. Moreover, in some instances, known methods can result in an incomplete sealing of the fractures and the introduction of foreign material into the formation. For example, sealing of micro fractures or the like can be difficult or impossible using such known methods.

Thus, a need exists for improved methods for sealing hydraulically fractured rock and refracturing.

SUMMARY

Methods for increased hydrocarbon recovery through mineralization sealing of hydraulically fractured rock within the subsurface to allow for refracturing are described herein. In some embodiments, a method includes preparing a composition, including a biochemical component delivered into a geological subsurface through a cased well bore. Nutrient solutions are delivered into the geological subsurface through the cased well bore, thereby metabolizing the nutrient solutions with the biochemical component to create a mineralizing byproduct. Mineralizing solutions are delivered into the geological subsurface through the cased well bore, delivering the composition, nutrient solutions, and mineralizing solutions to a targeted geological formation having a formation fracture via one or more casing openings, such as casing perforations or other casing openings. As a result, a crystallized mineral, produced at least in part by a reaction between the mineralizing solutions and the mineralizing byproduct, seals the formation fracture.

DETAILED DESCRIPTION

The present invention will now be described more fully hereinafter with references to the accompanying drawings. This invention may, however, be embodied in different forms and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

In some instances, formation (crystallization) of minerals in the geologic subsurface (i.e., mineralization) can be used to alter or modify the movement of subsurface fluids for various purposes, including enhancing movement further within the geological formations. Biomineralization, the use of biochemical components such as enzymes, bacteria, living organisms, microorganisms, components of living organisms, and/or products thereof to cause minerals to form, is one means for doing this. However, to be effective, biomineralization may need to occur in the proper reservoir rock location, usually deep in the targeted subsurface formation. Normally, initial access to the deep subsurface is by a well via vertical or horizontal drilling. The proper location for biomineralization is usually some distance from the well bore.

In some embodiments, a method includes preparing a composition, including a biochemical component delivered into a geological subsurface through a cased well bore. Nutrient solutions are delivered into the geological subsurface through the cased well bore, thereby metabolizing the nutrient solutions with the biochemical component to create a mineralizing byproduct. Mineralizing solutions are delivered into the geological subsurface through the cased well bore, delivering the composition, nutrient solutions, and mineralizing solutions to a targeted geological formation having a formation fracture via one or more casing openings, such as casing perforations or other casing openings. As a result, a crystallized mineral produced at least in part by a reaction between the mineralizing solutions and the mineralizing byproduct seals the formation fracture.

In some embodiments, mineralizing solutions react with a mineralizing byproduct to produce minerals, which crystallize in the existing formation fractures, sealing and strengthening the existing formation fractures and resulting in sealed fractures. Targeted geological formations may then be refractured, as described herein, to create new formation fractures outside of the sealed fractures, and expose new areas of trapped hydrocarbons to production, thereby, increasing hydrocarbon recovery. To gain access to hydrocarbon-bearing zones, original fractures can be sealed so that new fractures can be formed. In some embodiments, the methods described herein can be performed multiple times, permitting the well to be refractured multiple times—even within the same reservoir zone—to further increase hydrocarbon production. Seals formed by said method have been shown in the laboratory to be stronger than existing rock.

In some embodiments, the methods described herein can augment, and/or can be an alternative to, drilling and producing new horizontal wells in oil and gas fields. This process would seal existing fractures formed previously by the hydraulic fracturing process in the horizontal wells with newly formed minerals, which will allow the zone of a targeted geological formation to be hydraulically fractured again, exposing new hydrocarbons to production. In some instances, the methods described herein may be able to replace typical cement-based grouting or other sealing methods, as well as assist in environmental containment remediation, or geologic carbon sequestration.

In some instances, the methods described herein for biomineralization can be used to seal fractures in hydrocarbon rock reservoirs, such as sandstone and shale formations. Large sandstone cores have been shown to be hydraulically fractured, biomineralized, and then hydraulically fractured again. In some instances, a deep, subsurface sandstone formation can effectively be re-sealed by biomineralization following hydraulic fracturing. In some instances, fractures in shale can be rapidly cemented together via the biomineralization methods described herein, including fractures containing proppant. The concept of repairing fractured rock by biomineralization, followed by refracturing, can, in some instances, significantly increase oil and gas production from wells utilizing hydraulic fracturing. Moreover, the methods described herein can be applied multiple times to a given well to further increase hydrocarbon production.

As used in this specification, the singular forms "a," "an" and "the" include plural referents, unless the context clearly dictates otherwise. Thus, for example, the term "a member" is intended to mean a single member or a combination of members, "a material" is intended to mean one or more materials, or a combination thereof.

Figure 1A:
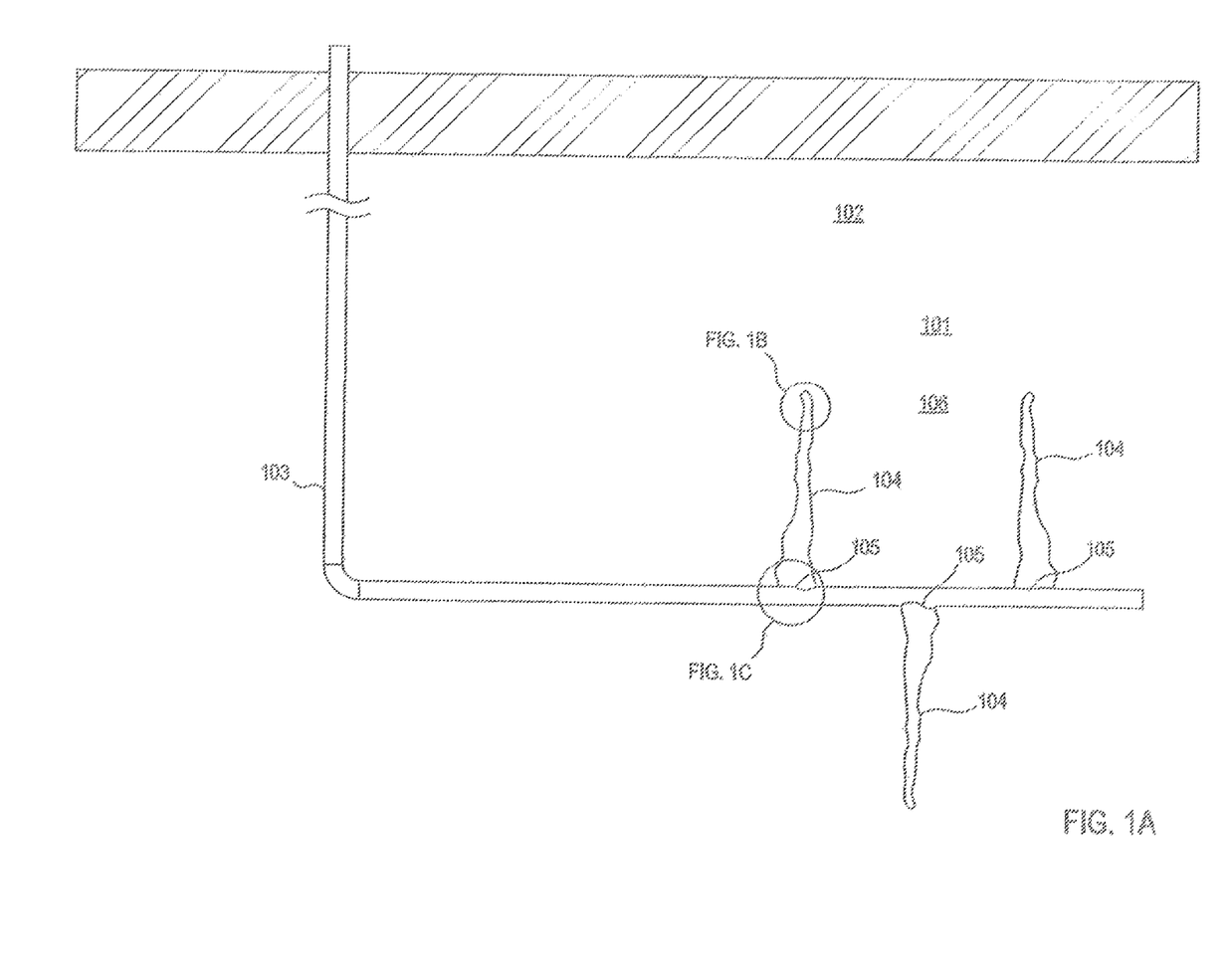
FIG. 1A illustrates a cross-sectional view of a cased well bore penetrating a fractured geological formation within a geological subsurface according to an embodiment.
Figure 1B:
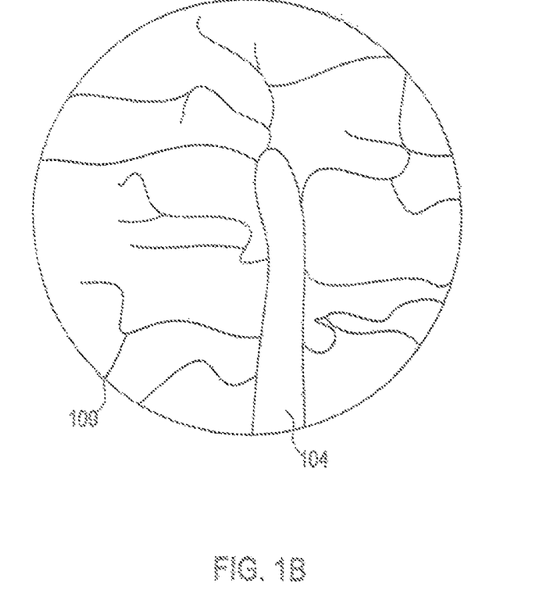
FIG. 1B is an enlarged view of a region of the cased well bore identified in FIG. 1A, illustrating micro fractures.
Figure 1C:
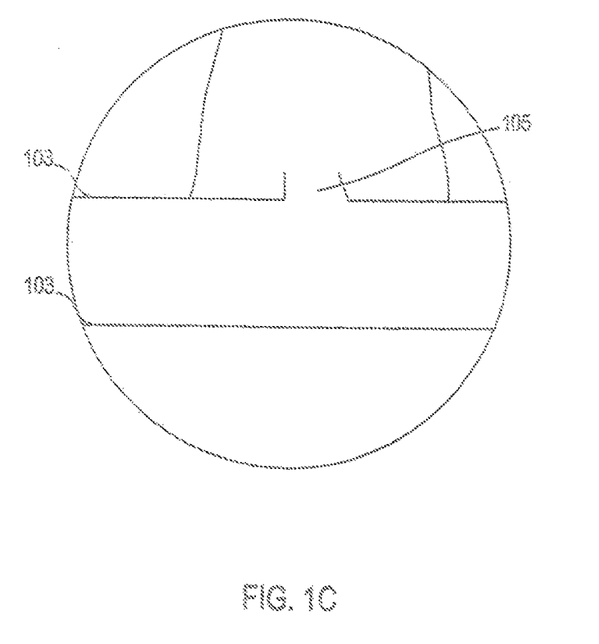
FIG. 1C is an enlarged view of a region of the cased well bore identified in FIG. 1A, illustrating a casing opening.
Figure 2:
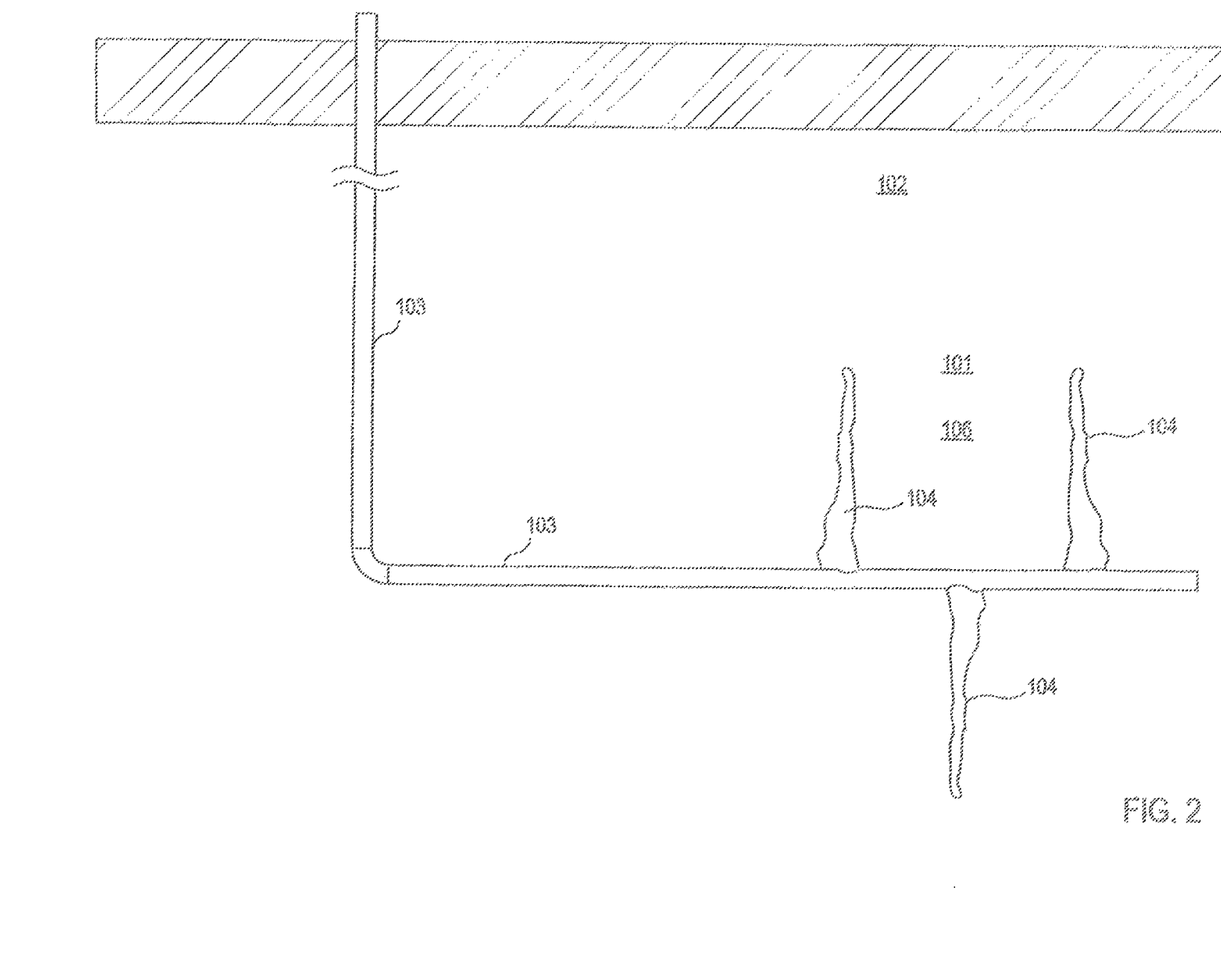
FIG. 2 illustrates a view of the cased well bore of FIG. 1A penetrating a fractured geological formation within the geological subsurface for a horizontal drilling.

FIG. 1A depicts a cross-sectional view of a cased well bore 103 penetrating a fractured geological formation 101 within a geological subsurface 102, in a typical oil or gas drilling operation, according to an embodiment. A targeted geological formation 106 can be any number of igneous, sedimentary, or metamorphic rock layers in the geological subsurface 102. Sedimentary sandstones, limestones, and shales are targeted geological formations 106 that can contain hydrocarbon reservoirs. The targeted geological formation 106 can contain existing formation fractures 104 that are either naturally occurring or are man-made. In some instances, the existing formation fractures 104 can include micro fractures 109, as depicted in FIG. 1B. In addition, casing openings 105, as shown in FIG. 1C, penetrating through the cased well bores 103, can allow an operator to conduct operations on the targeted geological formation 106 to add to the existing formation fractures 104. FIG. 2 depicts a similar view of the cased well bore 103 penetrating a fractured geological formation 101, with existing formation fractures 104, within the geological subsurface 102. FIG. 2 also depicts a horizontal drilling operation, where the production of hydrocarbons from a fractured formation 101 (e.g., the targeted geological formation 106) is declining.

Figure 3:
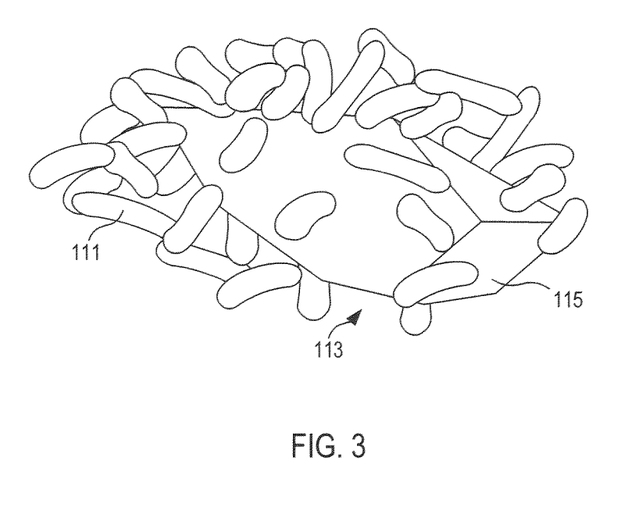
FIG. 3 illustrates a scanning electron microscope image of biochemical component such as living organisms and/or microorganisms, forming crystallized calcite within a formation fracture.
Figure 4:
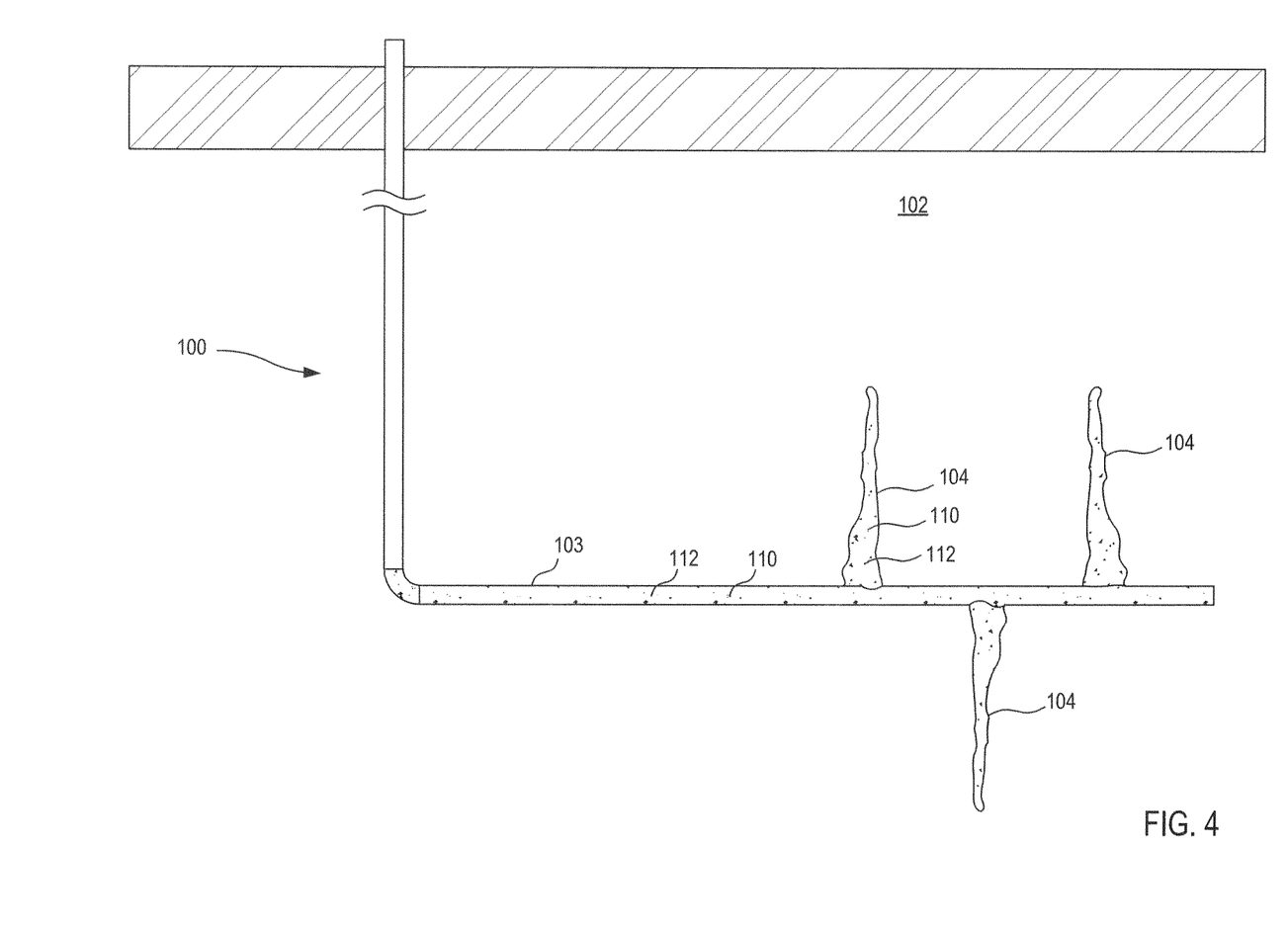
FIG. 4 illustrates a composition of a biochemical component in an aqueous solution, and nutrient solutions in the geological subsurface delivered through the cased well bore of FIG. 1A.

In some embodiments, to gain access to hydrocarbon-bearing zones, the existing formation fractures 104 can be sealed so that new fractures can be formed. As described herein, biomineralization can be used in some embodiments to seal the existing formation fractures 104. For example, FIG. 3 is an illustration of a scanning electron microscope image, taken at 7,000× magnification, of biochemical components 111 (e.g., live microorganisms) forming, for example, calcite 115. The biochemical components 111 can be enzymes, bacteria, living organisms, microorganisms, components of living organisms, and/or products thereof.

FIGS. 4-7 illustrate a method of increasing hydrocarbon recovery through biomineralization sealing 100 of fractured geological formations 101, followed by refracturing. The method includes preparing a composition 110, including the biochemical components 111 (FIG. 3) and an aqueous solution, and delivering the composition 110 into the geological subsurface 102 through the cased well bore 103. Also shown in FIG. 4, a nutrient solution 112 can be delivered or injected into the geological subsurface 102 through the cased well bore 103. The nutrient solution 112 can metabolize with the biochemical components 111 (e.g., living organisms) to create a mineralizing byproduct 113. In some instances, the mineralizing byproduct 113 can be one or more mineralizing conditions, depending on the biochemical components 111 such as, for example, carbonic acid, carbonate, bicarbonate, ammonia, ammonium, phosphate, phosphite, and/or any other suitable byproduct and/or condition. The nutrient solution 112 can include a carbon-nutrient source and other substances producing microbial growth. For example, the nutrient solution 112 can be yeast extract, nutrient broth, urea, and/or any other suitable solution, depending on the biochemical components 111.

Figure 5:
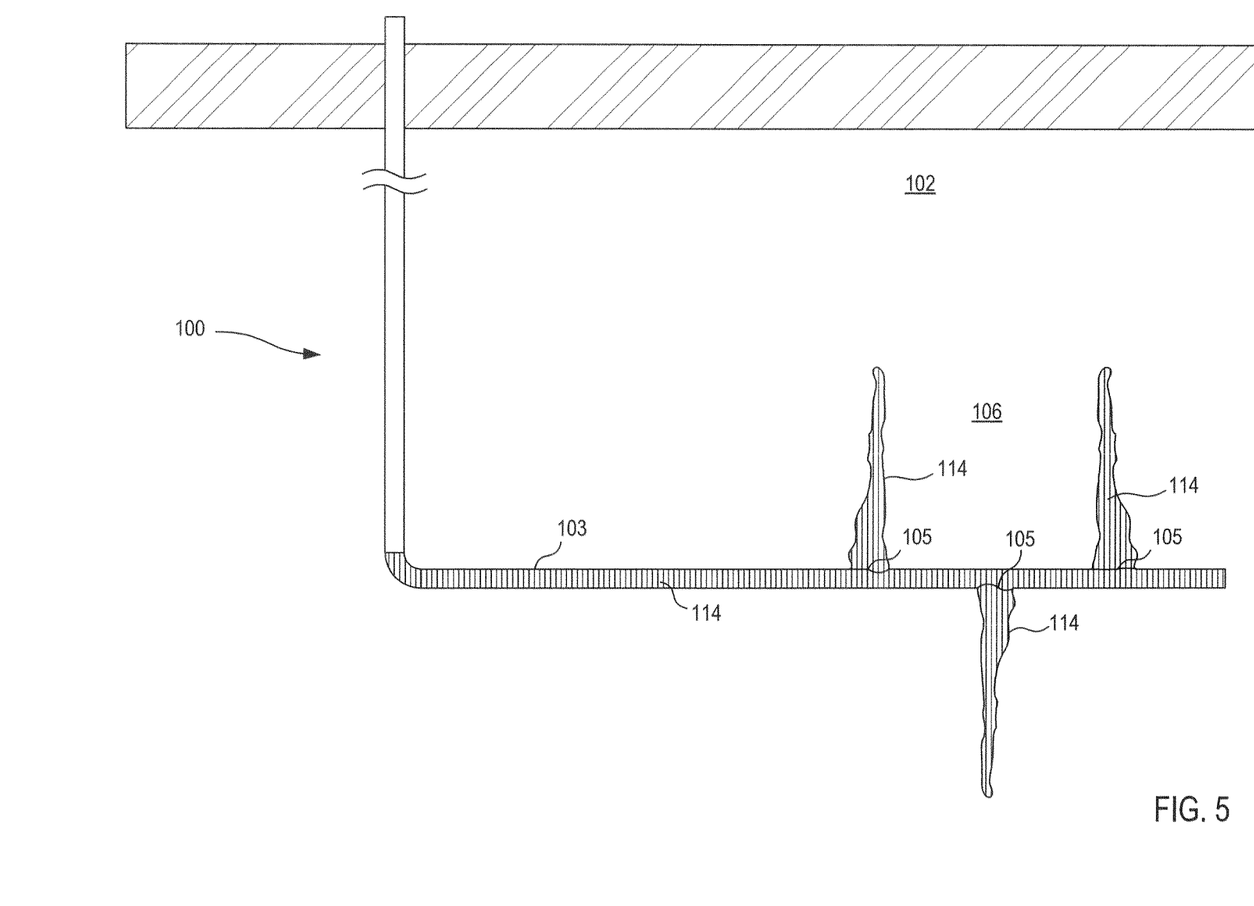
FIG. 5 illustrates mineralizing solutions in the geological subsurface delivered through the cased well bore of FIG. 1A.

As shown in FIG. 5, mineralizing solutions 114 can be delivered into the geological subsurface 102 through the well bore 103. Hence, in this embodiment, the composition 110 (FIG. 4), the nutrient solutions 112 (FIG. 4), and the mineralizing solutions 114 (FIG. 5) can be delivered to the targeted geological formation 106 with the existing formation fractures 104 through casing perforations 105 (FIG. 1C) in the cased well bore 103. In some instances, the mineralizing solutions 114 can depend on the biochemical components 111 and/or their applications. For example, the mineralizing solutions 114 can be urea, soluble ferrous iron salt, soluble manganese salt, soluble magnesium salt, soluble phosphate salt, soluble phosphite salt, soluble calcium salt, and/or any other suitable solution.

In some embodiments, for example, biochemical components such as microbes can hydrolyze urea to change the saturation state of various minerals, including carbonates such as calcium carbonate. For example, ureolytic bacteria can use a urease enzyme to catalyze hydrolysis of urea to form ammonia and carbonic acid, as shown in Equation 1:

$$CO(NH_2)_2 + 2H_2O \rightarrow 2NH_3 + H_2CO_3 \text{(Urea hydrolysis)} \quad \text{Equation 1}$$

The ammonia produced by the urea hydrolysis reaction reacts with water to form ammonium ions, resulting in a pH increase, as shown in Equation 2:

$$2NH_3 + 2H_2O \leftarrow\rightarrow 2NH_4^+ + 2OH^- \text{(pH increase)} \quad \text{Equation 2}$$

In some instances, depending on the system pH, carbonic acid is converted to bicarbonate and then carbonate ions, as shown in Equation 3:

$$H_2CO_3 + 2OH^- \leftarrow\rightarrow HCO_3^- + H_2O + OH^- \leftarrow\rightarrow CO_3^{2-} + 2H_2O \quad \text{Equation 3}$$

In some instances, if the pH is high enough, carbonate ions react with dissolved calcium to produce crystals of calcium carbonate, as shown in Equation 4:

$$CO_3^{2-} + Ca^{2+} \leftarrow\rightarrow CaCO_3 \text{(Calcium carbonate precipitation)} \quad \text{Equation 4}$$

The resulting biomineral (e.g., a "bio-cement," such as calcium carbonate) may cement together heavily fractured shale and reduce the permeability of fractures. The biomineralization sealing method 100, shown in FIG. 4-7, may be delivered via the composition 110. In some instances, the biomineralization sealing method 100 can result in advantages including a time-and-space-dependent placement of bio-cement plugs in the immediate vicinity of the well bore 103, as well as further away from the well bore 103 in the target geological formation 106. In some embodiments, the resulting biomineral can be a biofilm or the like such as those described in U.S. Patent Publication No. 2006/0216811 entitled, "Use of Bacteria to Prevent Gas Leakage, filed Feb. 3, 2006; and/or article to Adrienne J. Phillips et al., *Potential CO₂ Leakage Reduction through Biofilm-Induced Calcium Carbonate Precipitation*, Environ. Sci. Technol. 2013, 47, at 142-149, the disclosures of which are incorporated herein by reference in their entireties.

As described above with reference to FIG. 1B, the existing formation fractures 104 can include micro fractures 109. Without sealing micro fractures 109, newly fractured areas may merge into the existing formation fractures 104 shown in FIGS. 1 and 2, limiting the amount of increased hydrocarbon recovery to only a small area of what otherwise can be recovered. Large areas within the fractured geological formations 101 would be missed for hydrocarbon recovery, without the effective method of the invention to penetrate the new formation fractures 108, including micro fractures. In some instances, the seals formed by the biomineralization described above can be stronger than existing rock. In addition, in some instances, the biochemical components 111 (e.g., living organisms such as microorganisms and/or the like) and the biomineralization produced by the microorganisms can penetrate relatively deeply into the targeted geological formation 106 (FIG. 1A), to prevent short-circuiting from previously fractured formations, and particularly by micro fractures. More particularly, the mineralizing solutions 114 react with the mineralizing byproduct 113, producing minerals 115 and causing the minerals 115 to crystallize in the existing formation fractures 104, thereby sealing and strengthening the existing formation fractures

Figure 6:
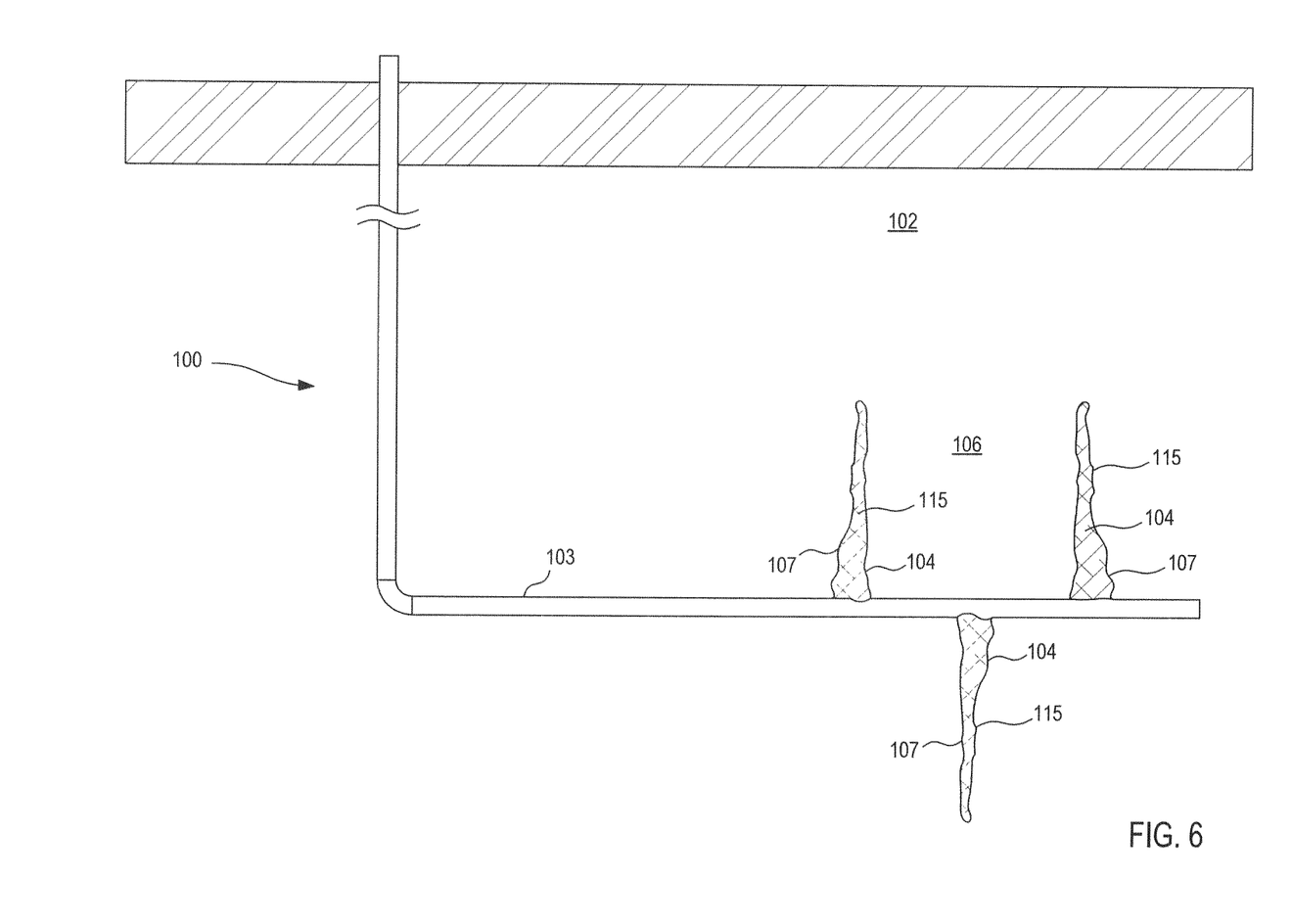
FIG. 6 illustrates sealed formation fractures resulting from minerals crystallized within the existing the formation fractures produced by mineralizing solutions within the formation fractures reacting with a mineralizing byproduct.
Figure 7:
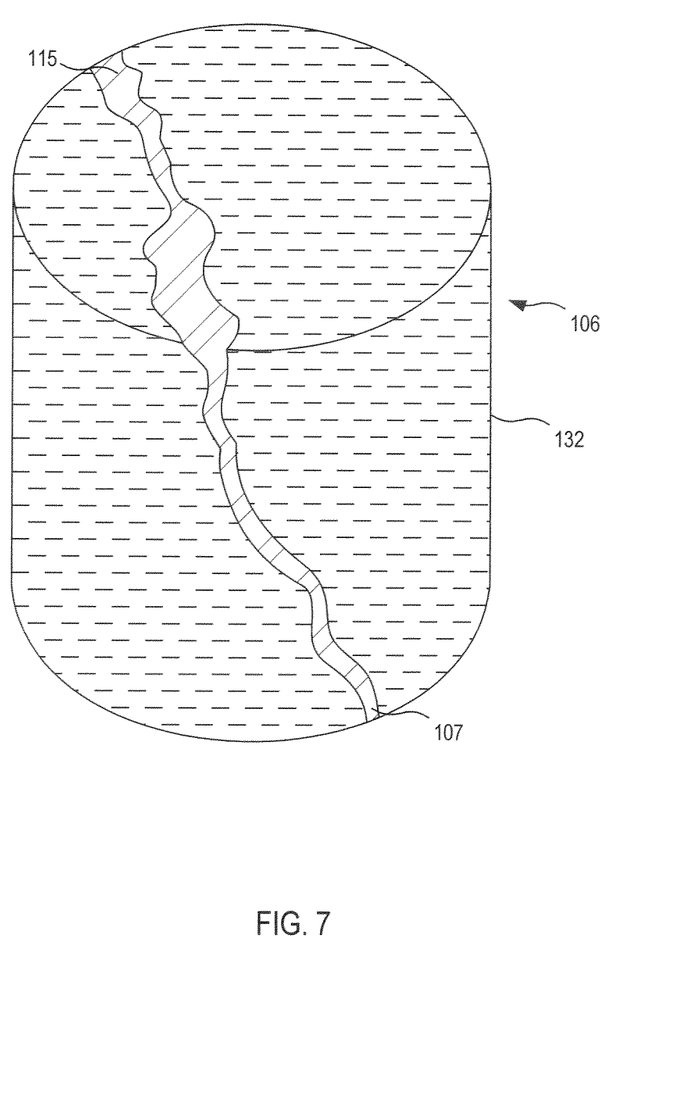
FIG. 7 illustrates a subsurface rock core sample, having minerals crystallized in the existing formation fracture, resulting in a sealed fracture.

104 and resulting in sealed fractures 107 (see e.g., FIG. 6 and the subsurface rock core sample 132 of FIG. 7). The resulting newly formed minerals 115 may be one or more of a calcium carbonate, magnesium carbonate, calcium phosphate, ferric oxide, manganese oxide, ferromanganese oxide, ferric phosphate, and/or the like.

Figure 8:
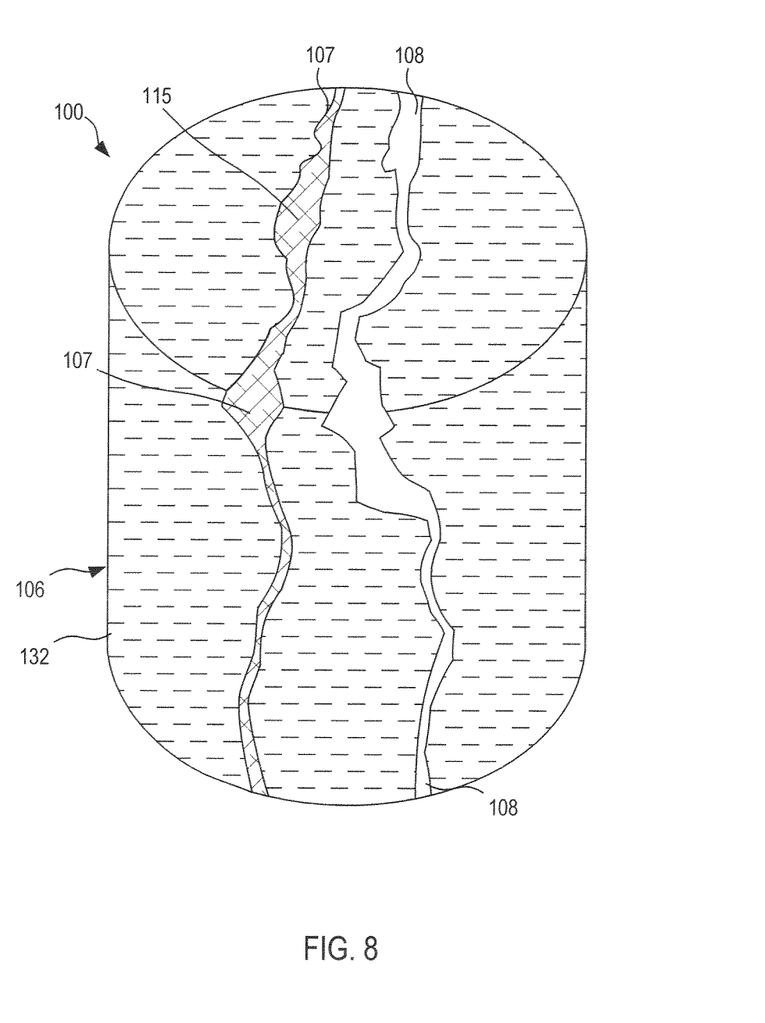
FIG. 8 illustrates the subsurface rock core sample, having minerals crystallized in the existing formation fracture, resulting in the sealed fracture of FIG. 7, and showing the targeted geological formation as refractured, creating a new formation fracture.
Figure 9:
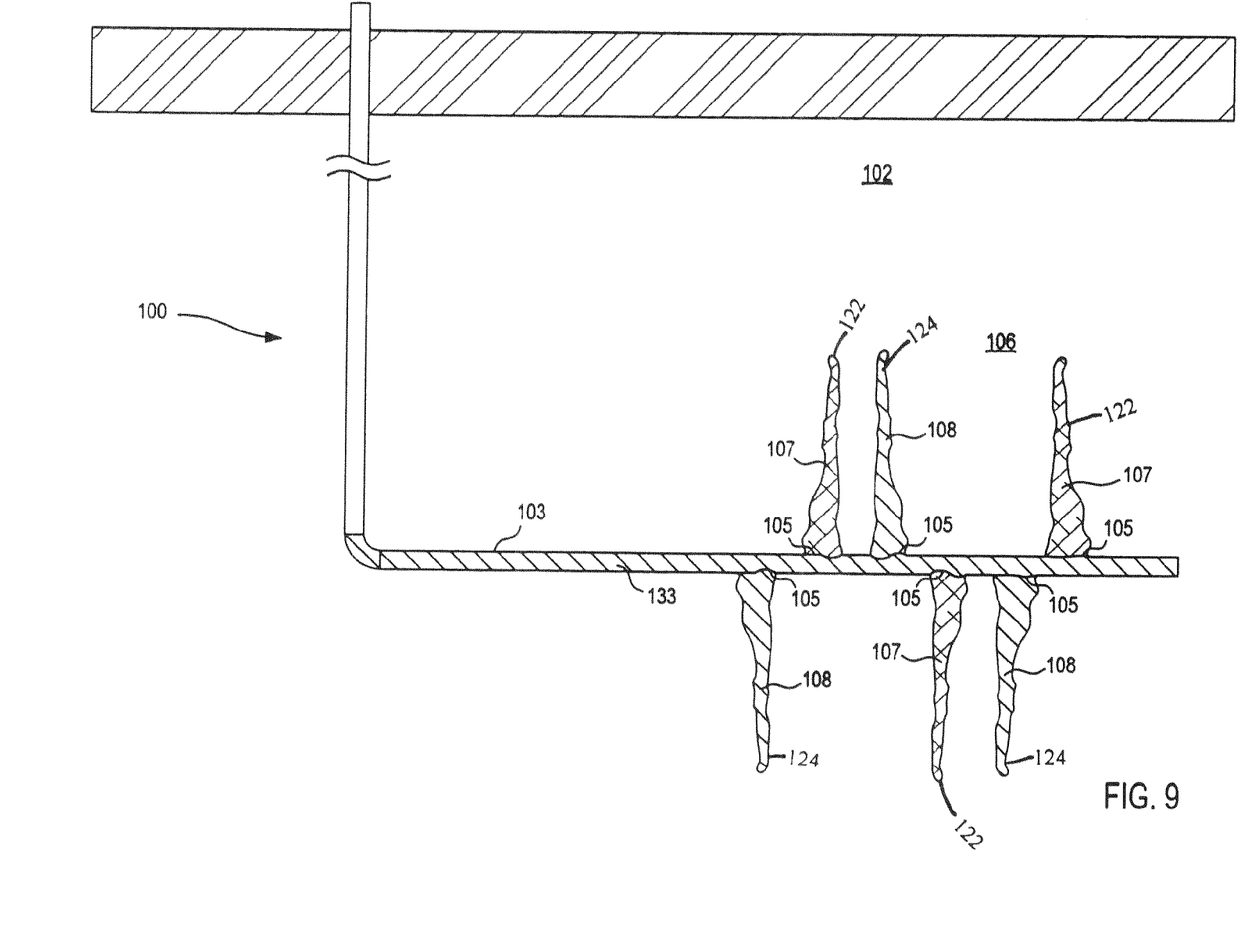
FIG. 9 illustrates the targeted geological formations in the horizontal cased well bore as refractured to produce new formation fractures, depicting the mineral-crystallized sealed fractures.

The newly formed minerals 115 allow the targeted geological formation 106 to be hydraulically fractured again by the operator. For example, as shown in FIGS. 8 and 9, the targeted geological formations 106 are refractured by the operator, hydraulically or by other fracturing means 133 (FIG. 9), creating new formation fractures 108 (FIGS. 8 and 9) outside of the sealed fractures 107, and exposing new areas of trapped hydrocarbons 116 within the targeted geological formation 106 to production of oil and gas. Thus, access to new hydrocarbon-bearing zones is gained, and the sealing method 100 can, thereby, increase hydrocarbon recovery through biomineralization-sealing of existing fractured geological formations 101, when followed by refracturing of the targeted geological formation 106 to produce new formation fractures 108.

In some instances, the biomineralization methods described herein can be used to seal fractures in sandstone and shale formations. Large sandstone cores can be hydraulically fractured, biomineralized, and then hydraulically refractured. Fractures in shale can be rapidly bio-cemented together via biomineralization, including fractures containing proppant. In some instances, repairing fractured rock by biomineralization, followed by refracturing, can substantially increase oil and gas production from wells utilizing hydraulic fracturing.

Figure 10:
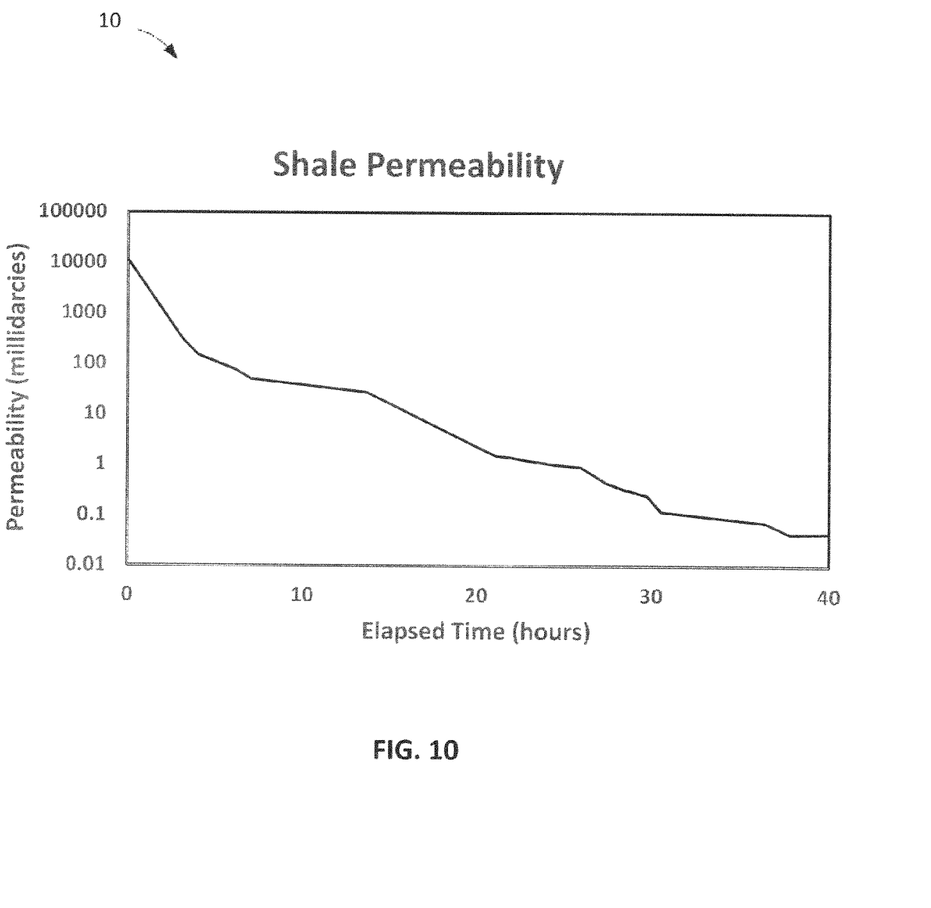
FIG. 10 is a graph illustrating a change in the permeability of shale over a given time.

FIG. 10 is a chart of shale permeability 10, illustrating a change in permeability of shale (measured in millidarcies) over a given time (measured in hours). The chart demonstrates the biomineralization methods described above in a core sample from a Bakken Shale formation well, in the Williston Basin. In some instances, fracture-sealing time can be reduced by the use of, for example, the biomineralization method 100, as indicated by the reduction over time in the permeability of shale for the plot of representative oil and gas wells. In some instances, the biomineralization-sealing method 100 can be optimized over time.

In some embodiments, the methods described herein can be applied concurrently with existing sealing technologies (e.g., cements, slurries, polymers, etc.) to fill smaller voids or micro fractures that may not otherwise be sealed with some known methods. In some embodiments, the methods described herein can be performed multiple times, permitting the well to be refractured multiple times—even within the same zone—to further increase hydrocarbon production.

In some embodiments, the method of subsurface mineralization to improve well-sealing, described herein, can mitigate the escape of subsurface gases, liquids and solids; can aid in geological formation sealing and stabilization; can enhance hydrocarbon recovery; can permit refracturing within previously fractured areas for increased hydrocarbon recovery; and/or can improve and/or complement cementing and squeezing techniques and delivery mechanisms to fill fractures and other voids smaller than 1 mm, where traditional sealing methods (e.g., cementing, polymer plugs, etc.) may fail.

In some embodiments, the metabolizing nutrient solutions react with the biochemical components (e.g., living organisms and/or the like) to create a mineralizing byproduct, and mineralizing solutions react with the mineralizing byproduct to produce minerals crystallizing in the formation fractures, attaching to fracture walls, and sealing and strengthening the formation fractures. Thus, the biomineralization methods described herein can induce mineralization deeper into the subsurface geological formations distal to the well bore.

In one of the embodiments, as shown in FIGS. 6 and 9, a composition 110 is prepared, including at least a biochemical component 111, a nutrient solution 112, and a mineralizing solution 114 after recovering at least a portion of a first volume of a hydrocarbon via a first fracture 122 formed in a geological subsurface 102, the method delivering the composition 110 to the first fracture 122 via a cased well bore 103. The first fracture 122 is sealed with a crystallized mineral 115 produced at least in part by a reaction between the composition 110 and a mineralizing byproduct 113 (FIG. 3) in the first fracture 122. The geological subsurface 102 is fractured to produce a second fracture 124 in fluid communication with a second volume of the hydrocarbon, different from the first volume of the hydrocarbon. At least a portion of the second volume of the hydrocarbon is recovered via the second fracture 124. Sealing the first fracture 122 strengthens at least a portion of the geological subsurface 102 defining the first fracture 122. In one of the embodiments, sealing the first fracture 122 or the second fracture 124 includes sealing one or more micro fractures 109.

Sealing the second fracture 124, in another of the embodiments, as shown in FIGS. 6 and 9, with a crystallized mineral 115 and fracturing the geological subsurface 102 produces a third fracture in fluid communication with a third volume of the hydrocarbon, different from the first volume of the hydrocarbon and the second volume of the hydrocarbon. Additional fractures in fluid communication with other volumes of the hydrocarbon may be produced in this manner.

In another one of the embodiments, a composition 110, shown in FIGS. 6 and 9, is prepared, including at least a biochemical component 111, a nutrient solution 112, and a mineralizing solution 114. The composition 111 is delivered into a formation fracture 104 of a targeted geological formation 106 via a cased well bore 103 and one or more casing openings 105 in fluid communication with the fracture 104, thereby sealing the fracture 104 with a crystallized mineral 115 produced at least in part by a reaction between the composition 110 and the targeted geological formation 106. One or more casing openings 105 is sealed as is the fracture 104. In one of the embodiments, shown in FIG. 9, the fracture 104 is a first fracture 122, the first fracture 122 being produced by a hydraulic fracturing operation comprising hydraulically fracturing the targeted geological formation 106 after sealing the first fracture 122 to produce a second fracture 124 different from the first fracture 122; and recovering a second volume of hydrocarbon trapped in the target geological formation 106 via the second fracture 124. In one of the embodiments, the composition 110 is prepared by metabolizing the nutrient solutions 112 with the biochemical component 111 to produce a mineralizing byproduct 113. The reaction in this embodiment between the composition 110 and the targeted geological formation 106 includes a reaction between the mineralizing solutions 114 and the mineralizing byproduct 113.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. A method, comprising:
preparing a composition including a biochemical component;
delivering the composition into a targeted geological formation within a geological subsurface through a cased well bore;
delivering nutrient solutions into the targeted geological formation within the geological subsurface through the cased well bore;
metabolizing the nutrient solutions with the biochemical component in the composition;
such that metabolization of the nutrient solutions with the biochemical component produces a mineralizing byproduct;
delivering mineralizing solutions into the targeted geological formation within the geological subsurface through the cased well bore;
wherein the delivering of the composition, the nutrient solutions, and the mineralizing solutions comprises delivering to a formation fracture in the targeted geological formation, via one or more casing openings, such that a crystallized mineral produced at least in part by a reaction between the mineralizing solutions and the mineralizing byproduct seals the formation fracture;
and
refracturing the targeted geological formation to (1) produce one or more additional formation fractures outside of the sealed formation fracture, and (2) expose new areas of trapped hydrocarbons; and
recovering at least a portion of the trapped hydrocarbons from the new areas of trapped hydrocarbons.

2. The method of claim 1, wherein the formation fracture includes micro fractures.

3. The method of claim 1, wherein the one or more casing openings include one or more casing perforations.

4. The method of claim 1, wherein the biochemical component is at least one of a bacteria or enzyme.

5. The method of claim 1, wherein the mineralizing solutions include at least one of a urea, soluble ferrous iron salt, soluble manganese salt, soluble magnesium salt, soluble phosphate salt, soluble phosphite salt, or soluble calcium salt.

6. The method of claim 1, wherein the nutrient solutions include at least one of a yeast extract, nutrient broth, or urea.

7. The method of claim 1, wherein the mineralizing byproduct includes at least one of a carbonic acid, carbonate, bicarbonate, ammonia, ammonium, phosphate, or phosphite.

8. The method of claim 1, wherein the crystallized mineral includes at least one of a calcium carbonate, calcium phosphate, magnesium carbonate, ferric oxide, manganese oxide, ferromanganese oxide, or ferric phosphate.

9. A method, comprising:
preparing a composition including at least a biochemical component, a nutrient solution, and a mineral solution after recovering at least a portion of a first volume of a hydrocarbon via a first fracture formed in a geological subsurface;
delivering the composition to the first fracture via a cased well bore;
sealing the first fracture with a crystallized mineral produced at least in part by a reaction between the composition and a surface of the first fracture;
fracturing the geological subsurface to produce a second fracture in fluid communication with a second volume of the hydrocarbon, different from the first volume of the hydrocarbon;
sealing the second fracture with a crystallized mineral; and
fracturing the geological subsurface to produce a third fracture in fluid communication with a third volume of the hydrocarbon, different from the first volume of the hydrocarbon and the second volume of the hydrocarbon.

10. The method of claim 9, further comprising:
recovering at least a portion of the second volume of the hydrocarbon via the second fracture.

11. The method of claim 9, wherein sealing the first fracture includes strengthening at least a portion of the geological subsurface defining the first fracture.

12. The method of claim 9, wherein sealing the first fracture includes sealing one or more micro fractures.

13. A method, comprising:
preparing a composition including at least a biochemical component, a nutrient solution, and a mineralizing solution;
delivering the composition into a fracture of a targeted geological formation via a cased well bore and one or more casing openings in fluid communication with the fracture; and
sealing the fracture with a crystallized mineral produced at least in part by a reaction between the composition and the targeted geological formation;
wherein the fracture is a first fracture, the first fracture being produced by a hydraulic fracturing operation, the method further comprising:
hydraulically fracturing the targeted geological formation after sealing the first fracture to produce a second fracture different from the first fracture; and
recovering a second volume of hydrocarbon trapped in the targeted geological formation via the second fracture.

14. The method of claim 13, wherein sealing the fracture includes sealing the one or more casing openings.

15. The method of claim 13, wherein preparing the composition includes metabolizing the nutrient solution with the biochemical component to produce a mineralizing byproduct, the reaction between the composition and the targeted geological formation including a reaction between the mineralizing solution and the mineralizing byproduct.

* * * * *

UNITED STATES PATENT AND TRADEMARK OFFICE
CERTIFICATE OF CORRECTION

PATENT NO. : 9,739,129 B2
APPLICATION NO. : 14/602127
DATED : August 22, 2017
INVENTOR(S) : Alfred B. Cunningham et al.

Page 1 of 1

It is certified that error appears in the above-identified patent and that said Letters Patent is hereby corrected as shown below:

On the Title Page

Item (72) Should Read:

Inventors:
Alfred B. Cunningham, Bozeman, MT (US);
Dwight Randall Hiebert, Butte, MT (US);
Adrienne J. Phillips, Bozeman, MT (US);
Robin Gerlach, Bozeman, MT (US)

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*